US012720586B2

(12) United States Patent
Soldati et al.

(10) Patent No.: US 12,720,586 B2
(45) Date of Patent: Aug. 25, 2026

(54) METHOD FOR USER DEVICE ASSISTED LINK ADAPTATION IN COMMUNICATION NETWORKS

(71) Applicant: Telefonaktiebolaget LM Ericsson (publ), Stockholm (SE)

(72) Inventors: Pablo Soldati, Solna (SE); Euhanna Ghadimi, Bromma (SE); Yu Wang, Solna (SE); Burak Demirel, Älvsjö (SE); Henrik Rydén, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 497 days.

(21) Appl. No.: 18/274,528

(22) PCT Filed: Jan. 28, 2022

(86) PCT No.: PCT/EP2022/052053

§ 371 (c)(1),
(2) Date: Jul. 27, 2023

(87) PCT Pub. No.: WO2022/162148

PCT Pub. Date: Aug. 4, 2022

(65) Prior Publication Data

US 2024/0098773 A1 Mar. 21, 2024

Related U.S. Application Data

(60) Provisional application No. 63/151,477, filed on Feb. 19, 2021, provisional application No. 63/143,471, filed on Jan. 29, 2021.

(51) Int. Cl.

| | |
|---|---|
| ***H04W 72/542*** | (2023.01) |
| ***H04L 1/00*** | (2006.01) |
| ***H04W 24/02*** | (2009.01) |

(52) U.S. Cl.
CPC ......... *H04W 72/542* (2023.01); *H04L 1/0003* (2013.01); *H04L 1/0009* (2013.01); *H04L 1/0023* (2013.01); *H04W 24/02* (2013.01)

(58) Field of Classification Search
CPC ... H04W 72/542; H04W 24/02; H04W 28/22; H04L 1/0003; H04L 1/0009; H04L 1/0023
See application file for complete search history.

(56) References Cited

U.S. PATENT DOCUMENTS 9,414,241 B2 * 8/2016 Ge ...................... H04W 72/541
10,785,003 B2 9/2020 Liu et al.

(Continued)

OTHER PUBLICATIONS

Author Unknown, "Technical Specification Group Radio Access Network; NR; Physical layer procedures for control (Release 16)," Technical Specification 38.213, Version 16.4.0, Dec. 2020, 3GPP Organizational Partners, 181 pages.

(Continued)

*Primary Examiner* — Habte Mered
(74) *Attorney, Agent, or Firm* — Sonoda & Kobayashi Intellectual Property Law; Sarvajit S. Patil

(57) ABSTRACT

Providing user device assisted link adaptation in communication networks is disclosed herein. In one embodiment, a method performed by a network node of a telecommunications network for optimizing selection of radio resources and transmission format for a communication session with a user device comprises receiving, by the network node, a link adaptation report message from the user device, wherein the link adaptation report message comprises a link adaptation report. The method further comprises determining a scheduling grant comprising an allocation of radio resources for the user device based on the link adaptation report. The method also comprises transmitting the scheduling grant to the user device.

15 Claims, 13 Drawing Sheets

(56) References Cited

U.S. PATENT DOCUMENTS

| | | | | |
|---|---|---|---|---|
| 2008/0240216 | A1* | 10/2008 | Kolding | H04W 52/48 375/E7.002 |
| 2012/0269143 | A1 | 10/2012 | Bertrand et al. | |
| 2013/0322276 | A1 | 12/2013 | Pelletier et al. | |
| 2013/0343215 | A1* | 12/2013 | Li | H04B 7/0417 370/252 |
| 2015/0229435 | A1* | 8/2015 | Kalyani | H04L 1/0019 370/329 |
| 2016/0337150 | A1* | 11/2016 | Larsson | H04L 1/0025 |
| 2020/0163155 | A1* | 5/2020 | Lee | H04W 72/23 |
| 2021/0274578 | A1* | 9/2021 | Yum | H04L 1/0001 |
| 2021/0344399 | A1* | 11/2021 | Levy | H04L 5/0053 |

OTHER PUBLICATIONS

Author Unknown, "Technical Specification Group Radio Access Network; NR; Radio Resource Control (RRC) protocol specification (Release 16)," Technical Specification 38.331, Version 16.3.1, Jan. 2021, 3GPP Organizational Partners, 932 pages.

International Search Report and Written Opinion for International Patent Application No. PCT/EP2022/052053, mailed May 24, 2022, 11 pages.

* cited by examiner

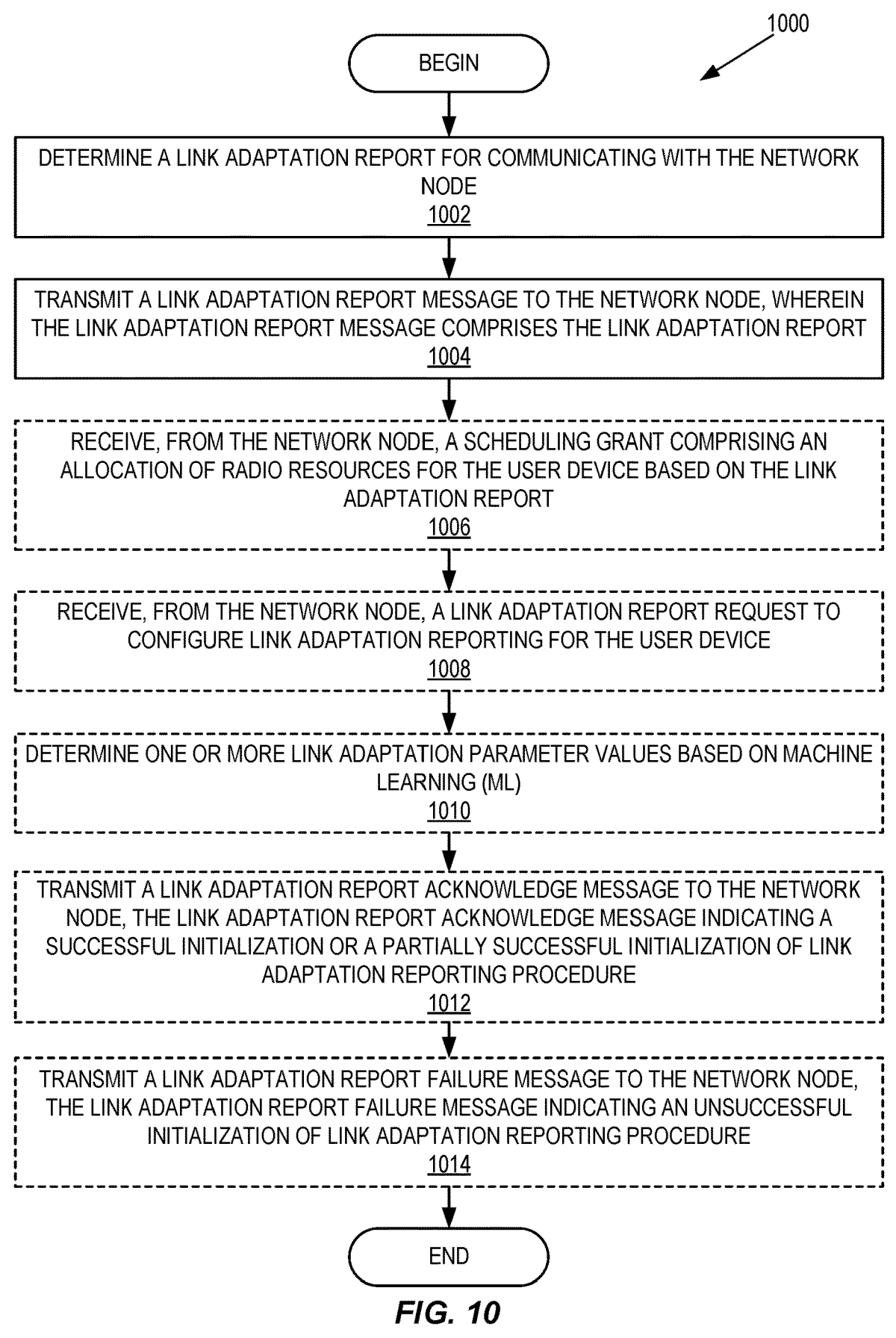

1000

BEGIN

DETERMINE A LINK ADAPTATION REPORT FOR COMMUNICATING WITH THE NETWORK NODE
1002

TRANSMIT A LINK ADAPTATION REPORT MESSAGE TO THE NETWORK NODE, WHEREIN THE LINK ADAPTATION REPORT MESSAGE COMPRISES THE LINK ADAPTATION REPORT
1004

RECEIVE, FROM THE NETWORK NODE, A SCHEDULING GRANT COMPRISING AN ALLOCATION OF RADIO RESOURCES FOR THE USER DEVICE BASED ON THE LINK ADAPTATION REPORT
1006

RECEIVE, FROM THE NETWORK NODE, A LINK ADAPTATION REPORT REQUEST TO CONFIGURE LINK ADAPTATION REPORTING FOR THE USER DEVICE
1008

DETERMINE ONE OR MORE LINK ADAPTATION PARAMETER VALUES BASED ON MACHINE LEARNING (ML)
1010

TRANSMIT A LINK ADAPTATION REPORT ACKNOWLEDGE MESSAGE TO THE NETWORK NODE, THE LINK ADAPTATION REPORT ACKNOWLEDGE MESSAGE INDICATING A SUCCESSFUL INITIALIZATION OR A PARTIALLY SUCCESSFUL INITIALIZATION OF LINK ADAPTATION REPORTING PROCEDURE
1012

TRANSMIT A LINK ADAPTATION REPORT FAILURE MESSAGE TO THE NETWORK NODE, THE LINK ADAPTATION REPORT FAILURE MESSAGE INDICATING AN UNSUCCESSFUL INITIALIZATION OF LINK ADAPTATION REPORTING PROCEDURE
1014

END

*FIG. 10*

METHOD FOR USER DEVICE ASSISTED LINK ADAPTATION IN COMMUNICATION NETWORKS

RELATED APPLICATIONS

This application is a 35 U.S.C. § 371 national phase filing of International Application No. PCT/EP2022/052053, filed Jan. 28, 2022, which claims the benefit of provisional Patent application Ser. No. 63/143,471, filed Jan. 29, 2021, and provisional patent application Ser. No. 63/151,477, filed Feb. 19, 2021, the disclosures of which are incorporated herein by reference in their entireties.

TECHNICAL FIELD

The present disclosure relates to link adaptation in a cellular communication system.

BACKGROUND

Link adaptation, or adaptive modulation and coding (AMC), is a technique used in wireless communications systems, such as the Third Generation Partnership Project (3GPP) High Speed Downlink Packet Access (HSDPA), Long Term Evolution (LTE), or New Radio (NR), to dynamically adapt the transmission rate of a communication link to the time- and frequency-varying channel conditions. Modulation and Coding Schemes (MCS) effectively adapt the transmission rate by matching the modulation and coding parameters used for communication to the conditions of the radio link, such as propagation loss, channel strength, interference from other signals concurrently transmitted in the same radio resources, and the like. Link adaptation is a dynamic process that acts potentially as frequently as each transmission time interval (e.g., on a millisecond time-scale in the 3GPP LTE system), wherein the communication link between a radio node and a user device is scheduled for transmission.

Therefore, link adaptation algorithms require some form of Channel State Information (CSI) at the transmitter to improve rate of transmission, and/or to reduce bit or block error rates. CSI is typically reported by the receiver to the transmitter. In 3GPP LTE and NR systems, for instance, a user device can be configured to report, periodically or event-based, CSI measurement reports to the network that provide a measure of channel quality experienced by a user device. CSI reports may comprise, for instance, a channel quality indicator (CQI), rank indication (RI), and Precoding Matrix Index (PMI) for leveraging spatial diversity in multiple-input multiple-output (MIMO) transmissions. In a time-division duplex (TDD) system, it is often reasonable to assume channel reciprocity, (i.e., that the quality of the downlink channel from the transmitter (the network node) to the receiver (the user device) is approximately the same as the uplink channel quality). Therefore, the network node can use estimates of the uplink channel state derived from uplink sounding reference signals as a measure of the downlink channel state to perform the link adaptation process for the downlink communication.

In either case, the channel state information available at the transmitter may be not very accurate, or may degrade over time. For instance, channel state information derived from sounding reference signals is used by the transmitter until a new sounding reference signal is received. This implies that the latest channel state estimate becomes less and less reliable over time. This is referred to as channel aging. In the 3GPP LTE system, for instance, a user device can be configured to transmit sounding reference signals as frequently as every 2 ms (i.e., every other radio subframe) or as infrequently as 160 ms (i.e., every 16 radio frames). When the user device estimates the channel state information for the network node, the channel state report is received within a certain delay and the channel state measurements may have been prefiltered by the user device either over time, or over frequency or spatial domains (e.g., such as over different transmission beams in a multi-antenna system).

The mismatch between the channel state estimate available at the transmitter and the effective instantaneous channel state between the transmitter and the receiver may introduce uncertainty and errors in the selection of the transmission parameters, such as modulation order, modulation and coding scheme (MCS) index, code rate, and the like, which may result in suboptimal performance. For instance, if the CSI is underestimated, the transmitter may configure a transmission with more conservative transmission parameter (e.g., a low modulation order). While this choice would make the transmission more robust to errors, less information would be transmitted in the allocated resource compared to the effective channel capacity, thereby resulting in reduced spectral efficiency and resource overutilization. On the other hand, if the channel quality is overestimated, the transmitter may configure more aggressive transmission parameters (e.g., a higher modulation order) and try to send more information than the channel capacity can carry, thereby increasing the probability of transmission failure. This would ultimately result in several retransmissions of the same information, thus reducing the user throughput as well as the network spectral efficiency.

Such mismatch can become severe in scenarios with rapidly varying channel conditions due to certain radio environment conditions, such as fast-moving user devices, sudden changes in traffic in neighboring cells, rapidly varying inter-cell interference, and the like. Therefore, link adaptation algorithms need to account for inaccurate channel state information to achieve high spectral efficiency in the data transmission.

Link adaptation algorithms attempt to optimally adapt the transmission data rate chosen for a link to the current channel and interference conditions of the link. FIG. 1 shows an example of how link adaptation can be implemented in a radio access network (RAN). A RAN typically relies on a discrete number of transmission rates that can be configured for a downlink transmission or an uplink transmission. Such discrete rate values are typically mapped to different combinations of modulation order and coding rate, also referred to as MCS values. Link adaptation algorithms adapt the communication rate of a radio link by selecting the most appropriate MCS value based on the latest information available about the state of the communication system as well as the state of the individual communication link for which the MCS value is selected.

State of the art of RAN systems, such as the 3GPP LTE and NR systems, rely on link adaptation strategies that aim to control the error decoding rate for each communication session over a radio link, also referred to as the Block Error Rate (BLER). A common strategy is to adapt the MCS selection, hence the data transmission rate, to maintain the average BLER for a communication session link below or equal to a certain value, hereafter referred to as "BLER target". A typical BLER target choice is 10% BLER, that is, link adaptation aims at a 90% successful transmission rate at the first transmission attempt. To this end, the link adaptation algorithm executed by a network node exploits the CSI reported by the user device, such as the CQI, RI and PM, to derive an estimate of the signal to noise and interference ratio (SINR) experienced over the radio link by the user device, as illustrated in FIG. 1. Such initial estimate is then corrected by an offset value based on parameters computed as a function of the desired BLER target and the feedback from hybrid automatic repeat request (HARQ) process (i.e., positive and negative acknowledgement of previous transmissions over the link) to derive an effective SINR estimate which, in average, would yield a 10% BLER. The effective SI NR estimate is ultimately used to select a MCS value for the next transmission attempt which can ensure a 10% BLER.

The BLER target used by link adaptation algorithms provides a proxy parameter for controlling the average quality of a communication session. Depending on the channel state of the communication link, however, an incorrect setting of the BLER target can result into an excessive usage of radio resources (e.g., if a too low BLER target is required from a communication link with poor channel quality, or in poor performance if a too high BLER target is configured for a link with very good channel performance).

SUMMARY

Methods and apparatus are disclosed herein for providing user device assisted link adaptation in communication networks. Embodiments of a method performed by a network node of a telecommunications network for optimizing selection of radio resources and transmission format for a communication session with a user device are disclosed herein. The method comprises receiving, by the network node, a link adaptation report message from the user device, wherein the link adaptation report message comprises a link adaptation report. The method further comprises determining a scheduling grant comprising an allocation of radio resources for the user device based on the link adaptation report. The method also comprises transmitting the scheduling grant to the user device. In some embodiments disclosed herein, the link adaptation report further comprises an indicator indicating whether the one or more link adaptation parameters is associated with uplink or downlink transmission. Some embodiments disclosed herein may provide that the link adaptation report comprises a set of one or more link adaptation parameters estimated or preferred by the user device for link adaptation in a communication session with the network node. According to some such embodiments disclosed herein, the one or more link adaptation parameters comprises one or more of a modulation order or a Modulation and Coding Scheme (MCS) index. In some such embodiments disclosed herein, the link adaptation report further comprises, for one or more of the one or more link adaptation parameters, one or more indicators of an associated estimated probability of success, an associated uncertainty in the associated estimated probability of success, or an associated confidence interval for the associated estimated probability of success.

Some embodiments disclosed herein may provide that the link adaptation report further comprises a set of the one or more link adaptation parameters to be prioritized with an associated priority value. According to some embodiments disclosed herein, the link adaptation report comprises one or more sets of at least one MCS index value, each set is associated with a different transmission rank value. In some embodiments disclosed herein, the link adaptation report comprises one or more ranges of MCS index values, and each range is associated with a different transmission rank value. Some embodiments disclosed herein may provide that the link adaptation report comprises one or more sets of at least one modulation order value and/or one or more sets of at least one coding rate value, and each set is associated with a different transmission rank value. According to some embodiments disclosed herein, the link adaptation report comprises one or more ranges of modulation order values and/or one or more ranges of coding rate values, and each range is associated with a different transmission rank value. In some embodiments disclosed herein, the link adaptation report comprises link adaptation parameters reported for one or more frequency bands. Some such embodiments disclosed herein may provide that the link adaptation report further comprises link adaptation information reported according to one or more of wideband, per sub-band, per physical resource block (PRB), per resource block group, (RBG), per bandwidth part, and per bandwidth segment in a frequency domain. According to some embodiments disclosed herein, the link adaptation report comprises link adaptation information reported according to a granularity in a time domain, and the granularity is per transmission time interval and/or per transmission time window.

In some embodiments disclosed herein, the method further comprises transmitting a link adaptation report request to the user device, wherein the link adaptation report request comprises one or more information elements for configuring reporting of assistance information associated with link adaptation from the user device. Some such embodiments disclosed herein may provide that the one or more information elements comprises one or more indications of a type and frequency of reporting. According to some such embodiments disclosed herein, the type and frequency of reporting comprises periodic reporting or aperiodic reporting. In some such embodiments disclosed herein, the one or more information elements comprises a type of link adaptation information reported. Some such embodiments disclosed herein may provide that the type of link adaptation information reported comprises one or more of estimated modulation order, preferred modulation order, estimated MCS index, preferred MCS index, estimated code rate, preferred code rate, transport block size, or type of retransmission method. According to some such embodiments disclosed herein, the one or more information elements comprises a granularity of link adaptation information reported in one or more of a time domain, a frequency domain, or a spatial domain. In some such embodiments disclosed herein, the one or more information elements comprises a type of reference signals that the user device can use for determining link adaptation information. Some such embodiments disclosed herein may provide that the one or more information elements comprises one or more indications to start, stop, pause, resume and/or modify link adaptation reporting. According to some such embodiments disclosed herein, the link adaptation report request comprises a list of time-frequency resources that the user device can use to transmit the link adaptation report.

In some embodiments disclosed herein, determining the scheduling grant comprises selecting a reported MCS index value reported by the user device for determining an allocation of physical resource blocks, modulation order, code rate, and transport block size for communicating with the user device, either in uplink or downlink, in a transmission time interval. Some embodiments disclosed herein may provide that determining the scheduling grant comprises combining a preference or estimate of MCS index values reported by the user device with another channel state information (CSI), and the CSI comprises one or more of a channel quality indicator (CQI), a rank, or a precoding matrix indicator (PMI) for determining an allocation of radio resources for communicating with the user device. According to some embodiments disclosed herein, the method further comprises receiving, by the network node, a link adaptation report acknowledge message from the user device, wherein the link adaptation report acknowledge message indicates a successful initialization or a partially successful initialization of link adaptation reporting procedure. In some embodiments disclosed herein, the method further comprises receiving, by the network node, a link adaptation report failure message from the user device, wherein the link adaptation report failure message indicates an unsuccessful initialization of link adaptation reporting procedure.

Embodiments of a network node of a telecommunications network are also disclosed herein. Some embodiments disclosed herein may provide that the network node is adapted to receive, by the network node, a link adaptation report message from a user device, wherein the link adaptation report message comprises a link adaptation report. The network node is further adapted to determine a scheduling grant comprising an allocation of radio resources for the user device based on a reported MCS index of the link adaptation report. The network node is also adapted to transmit the scheduling grant to the user device. According to some embodiments disclosed herein, the network node is further adapted to perform any of the operations attributed to the network node above.

Embodiments of a network node of a telecommunications network are also disclosed herein. In some embodiments disclosed herein, the network node comprises one or more transmitters, one or more receivers, and processing circuitry associated with the one or more transmitters and the one or more receivers. The processing circuitry is configured to cause the network node to receive, by the network node, a link adaptation report message from a user device, wherein the link adaptation report message comprises a link adaptation report. The processing circuitry is further configured to cause the network node to determine a scheduling grant comprising an allocation of radio resources for the user device based on a reported MCS index of the link adaptation report. The processing circuitry is also configured to cause the network node to transmit the scheduling grant to the user device. Some embodiments disclosed herein may provide that the processing circuitry is additionally configured to cause the network node to perform any of the operations attributed to the network node above.

Embodiments of a method performed by a user device of a telecommunications network for optimizing selection of radio resources and transmission format for a communication session with a network node are also disclosed herein. The method comprises determining a link adaptation report for communicating with the network node. The method further comprises transmitting a link adaptation report message to the network node, wherein the link adaptation report message comprises the link adaptation report. According to some embodiments disclosed herein, the method further comprises receiving, from the network node, a scheduling grant comprising an allocation of radio resources for the user device based on the link adaptation report.

In some embodiments disclosed herein, the method further comprises receiving, from the network node, a link adaptation report request to configure link adaptation reporting for the user device, wherein determining the link adaptation report for communicating with the network node is based on the link adaptation report request. Some such embodiments disclosed herein may provide that the link adaptation report request comprises one or more information elements for configuring reporting of assistance information associated with link adaptation and reporting. According to some such embodiments disclosed herein, the one or more information elements comprises one or more indications of a type and frequency of reporting. In some such embodiments disclosed herein, the type and frequency of reporting comprises periodic reporting or aperiodic reporting. Some such embodiments disclosed herein may provide that the one or more information elements comprises a type of link adaptation information reported. According to some such embodiments disclosed herein, the type of link adaptation information reported comprises one or more of estimated modulation order, preferred modulation order, estimated MCS index, preferred MCS index, estimated code rate, preferred code rate, transport block size, or type of retransmission method.

In some such embodiments disclosed herein, the one or more information elements comprises a granularity of reported link adaptation information in one or more of a time domain, a frequency domain, or a spatial domain. Some such embodiments disclosed herein may provide that the one or more information elements comprises a type of reference signals that the user device can use for determining link adaptation information. According to some such embodiments disclosed herein, the one or more information elements comprises one or more indications to start, stop, pause, resume and/or modify link adaptation reporting. In some such embodiments disclosed herein, the link adaptation report request comprises a list of time-frequency resources that the user device can use to transmit the link adaptation report.

Some embodiments disclosed herein may provide that the method further comprises determining, by the user device, one or more link adaptation parameter values based on machine learning (ML). According to some embodiments disclosed herein, the method further comprises transmitting a link adaptation report acknowledge message to the network node, the link adaptation report acknowledge message indicating a successful initialization or a partially successful initialization of link adaptation reporting procedure. In some embodiments disclosed herein, the method further comprises transmitting a link adaptation report failure message to the network node, the link adaptation report failure message indicating an unsuccessful initialization of link adaptation reporting procedure.

Embodiments of a user device are also disclosed herein. Some embodiments disclosed herein may provide that the user device is adapted to determine a link adaptation report for communicating with a network node of a telecommunications network. The user device is further adapted to transmit a link adaptation report message to the network node, wherein the link adaptation report message comprises the link adaptation report. According to some embodiments disclosed herein, the user device is further adapted to perform any of the operations attributed to the user device above.

Embodiments of a user device are also disclosed herein. In some embodiments disclosed herein, the user device comprises one or more transmitters, one or more receivers, and processing circuitry associated with the one or more transmitters and the one or more receivers. The processing circuitry is configured to cause the user device to determine a link adaptation report for communicating with a network node of a telecommunications network. The processing circuitry is further configured to cause the user device to transmit a link adaptation report message to the network node, wherein the link adaptation report message comprises the link adaptation report. Some embodiments disclosed herein may provide that the processing circuitry is further configured to cause the user device to perform any of the operations attributed to the user device above.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 10 illustrates exemplary operations of a user device to optimize the selection of radio resources and transmission format for a communication session with a network node according to some embodiments disclosed herein;

DETAILED DESCRIPTION

Figure 1:
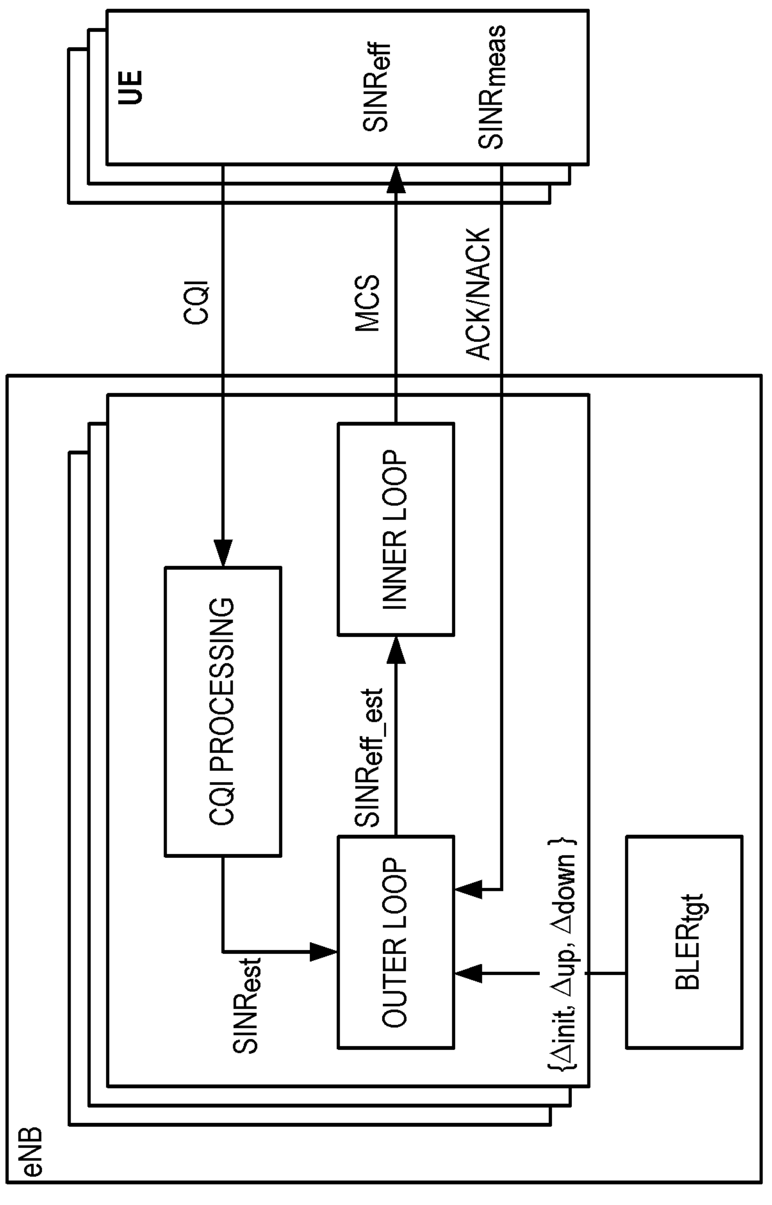
FIG. 1 illustrates an exemplary implementation of link adaptation in a radio access network (RAN)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenge(s). In particular, state of the art communication systems, such as the 3GPP LTE and 5G NR systems, traditionally configure a fixed BLER target common for all user devices with the same type of traffic. In some implementations, the same BLER target is configured for all user devices in the coverage area of a radio network node regardless of their traffic type. Furthermore, the BLER target is typically not adapted over time but kept fixed for all links.

While this approach can simplify some implementation aspects of the radio communication system, in general it leads to suboptimal system performance due to non-stationary and rapidly varying channel conditions, both over time and frequency domain. The BLER target is supposed to provide a control parameter to adjust the configuration setting of a communication link to its channel state to adapt to deep channel fade or interference.

On one hand, configuring the same BLER target for all users with the coverage area of a radio network node (or worse, within larger parts of the network) can be problematic as different users typically experience different channel states and interference. For instance, it would be desirable to configure high BLER targets to make the communication link robust from rapidly varying interference, at the expense of higher usage of communication resources. However, user devices closer to the transmitter are less affected by rapidly varying interference than user devices located further away from the transmitter. Therefore, setting a high BLER target for all users would potentially result in a system performance degradation as fewer radio resources would be made available for user devices with good channel conditions. A similar argument can be made if the system would configure a too low BLER target for all users. In this case, the system would optimistically assume robust communication links for all users, which would be harmful for users affected by strong interference.

On the other hand, keeping the BLER target fixed within a communication session can only allow tracking of average channel behavior and therefore cannot fully exploit the potential of a communication link. Being able to adapt the BLER target within a communication session is desirable to set the configuration parameters for the communication link more opportunistically to increase the overall spectral efficiency and quality of service (e.g., by setting a higher BLER target when the communication link suffers from higher interference or bad channel quality, or setting lower BLER targets when the channel conditions are more favorable).

However, adapting the BLER target of a communication link dynamically during a communication session is not trivial as it adds an additional control loop within the link adaptation. On one hand, the BLER target is used as input to the outer loop link adaptation (OLLA) algorithm, which typically requires hundreds of milliseconds to control the actual BLER toward the target BLER. Since the convergence time is not constant, changing the BLER target should be done carefully to avoid instability issues in OLLA. On the other hand, the channel quality reports from the user device are typically the result of filtered measurements which hide the channel variations that the BLER adaptation algorithm should track and compensate for.

More recent approaches to link adaptation have considered machine learning based solutions to optimize the performance of link adaptation. In one relevant case, machine learning has been suggested to optimize the BLER target used for the link adaptation algorithm in a communication session with a user device. In this case, machine learning is not used to design a new link adaptation algorithm per se (i.e., the other loop and the inner loop link adaptation algorithms), but only for tuning a hyper-parameter of the link adaptation algorithm: the BLER target. Different machine learning based algorithms have been suggested to configure a proper BLER target for link adaptation, such as regression models of the spectral efficiency, multi-class classifiers, armed bandit, contextual multi-armed bandit (CMAB), reinforcement learning, Thompson Sampling, and the like. While configuring the link adaptation algorithm with a different BLER target for different user devices can match the corresponding channel and interference environment, the resulting solutions cannot achieve the full performance of the radio link between the user device and the network node as the outer loop link adaptation design retains all its drawbacks (such as slow convergence rate to a good correction of the SINR estimate) which in turns limits the achievable performance.

Aspects of the present disclosure and their embodiments may provide solutions to the aforementioned or other challenges. There are, proposed herein, various embodiments which address one or more of the issues disclosed herein. Computer implemented methods performed at a network node of a telecommunications network for optimizing the selection of radio resources and transmission format for a communication session with a user device are disclosed herein. In some embodiments, the method comprises receiving a link adaptation report message from the user device comprising a link adaptation report, determining a scheduling grant comprising an allocation of radio resources for the user device based on the link adaptation report, and transmitting the scheduling grant to the user device. Some embodiments may provide that the network node transmits a link adaptation report request to configure link adaptation reporting for a user device. Additional embodiments characterize the configuration of the link adaptation reporting procedure in terms of the following:

- Type and frequency of the reporting;
- Type of link adaptation information reported, such as estimated or preferred modulation order, MCS index, code rate, transport block size, type of retransmission method, measured block error rate, and the like;
- Granularity of the reported link adaptation information in time domain, frequency domain, and spatial domain;
- Type of reference signals that the user device can use for determining link adaptation information;
- a list of time-frequency resources that the user device can use to transmit the link adaptation report to one or more network nodes.

Some embodiments may provide that the network node receives a link adaptation report acknowledge message from the user device indicating a successful initialization of the link adaptation reporting procedure. According to some embodiments, the network node may receive a link adaptation report failure message from the user device indicating an unsuccessful initialization of the link adaptation reporting procedure.

Computer implemented methods performed by a user device in a communication network for optimizing the selection of radio resources and transmission format for a communication session with a network node are also disclosed herein. In some embodiments, the method comprises determining a link adaptation report for communicating with a network node, and transmitting a link adaptation report message to a network node comprising the link adaptation report. Some embodiments may provide that the user device may additionally receive a link adaptation report request message to configure link adaptation reporting for a user device, and determine the link adaptation report for communicating with a network node based on the link adaptation report request message. According to some embodiments, the user device may transmit a link adaptation report acknowledge message to the network node indicating a successful initialization of link adaptation reporting procedure. In some embodiments, the user device may transmit a link adaptation report failure message to the network node indicating an unsuccessful initialization of link adaptation reporting procedure.

Certain embodiments may provide one or more of the following technical advantage(s). In particular, the proposed method allows for optimization of the transmission format for transmissions occurring over a communication link between a user device and a network node. One advantage of the method herein disclosed is to enable the network node to optimize the link adaptation parameters, such as MCS index, modulation order, code rate, transmission rank, and the like, by means of link adaptation state information reported by the user device. As such, the link adaptation parameters may be better optimized from the very beginning of a communication session, which is especially beneficial in the case of short packet transmission (when conventional link adaptation based optimization to achieve a certain BLER target is known to be ineffective).

Another advantage of the method is to enable more accurate link adaptation information to be used by a network node when selecting link adaptation parameters for configuring a transition to a user device. Traditional link adaptation methods based on CSI rely on proprietary function mappings between SINR and CQI values, which are not shared between user device and network node. By enabling a user device to directly share richer link adaptation state information with a network node, the network node can configure link adaptation parameters that can lead to better user performance (e.g., in terms of improved spectral efficiency and latency), better user experience, and an overall better network performance.

Before discussing providing user device assisted link adaptation in communication networks in greater detail, the following terms are first defined:

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 2:
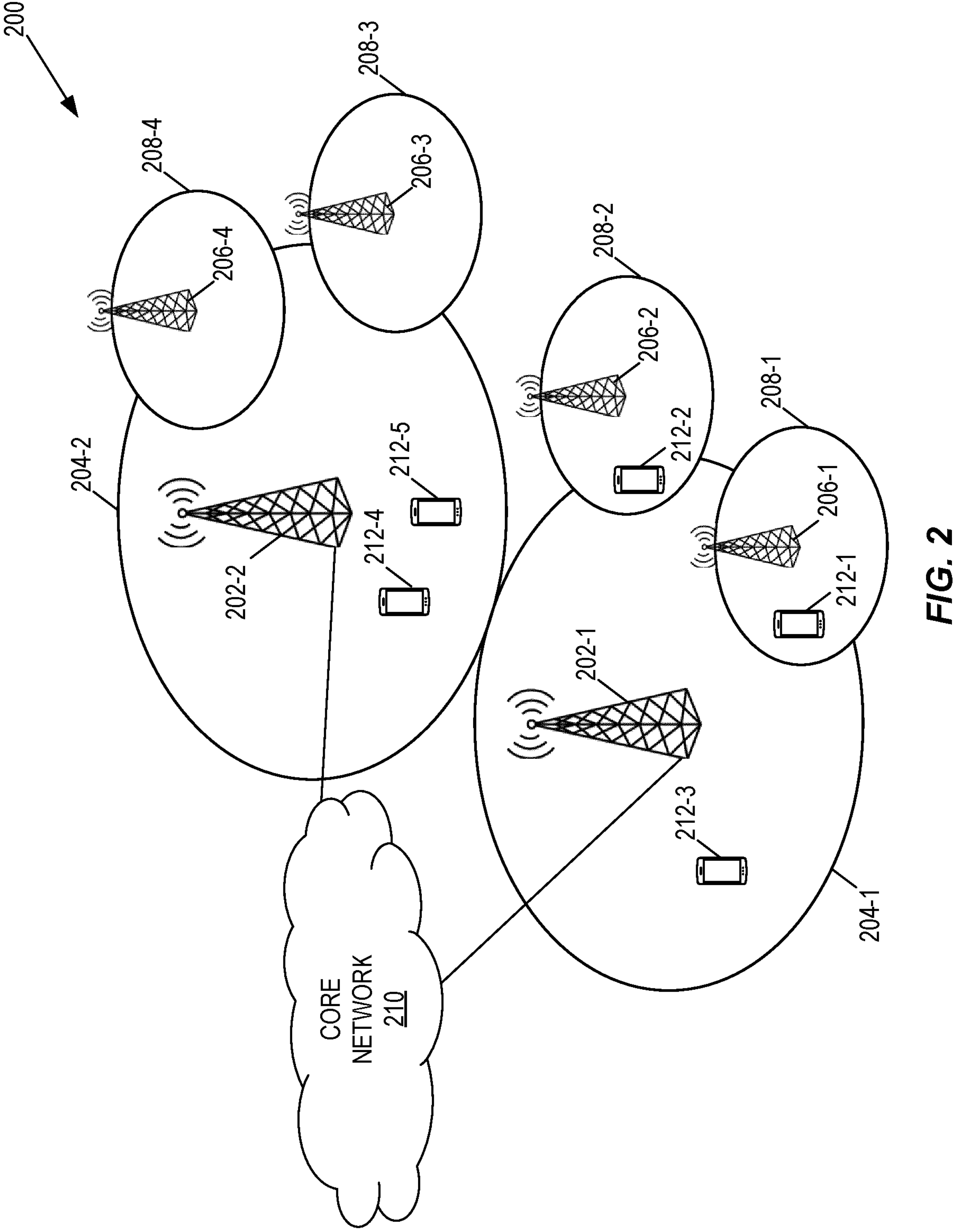
FIG. 2 illustrates one example of a cellular communications system according to some embodiments disclosed herein.

FIG. 2 illustrates one example of a cellular communications system 200 in which embodiments of the present disclosure may be implemented. In the embodiments described herein, the cellular communications system 200 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 202-1 and 202-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5G System (5GS) is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

Figure 3:
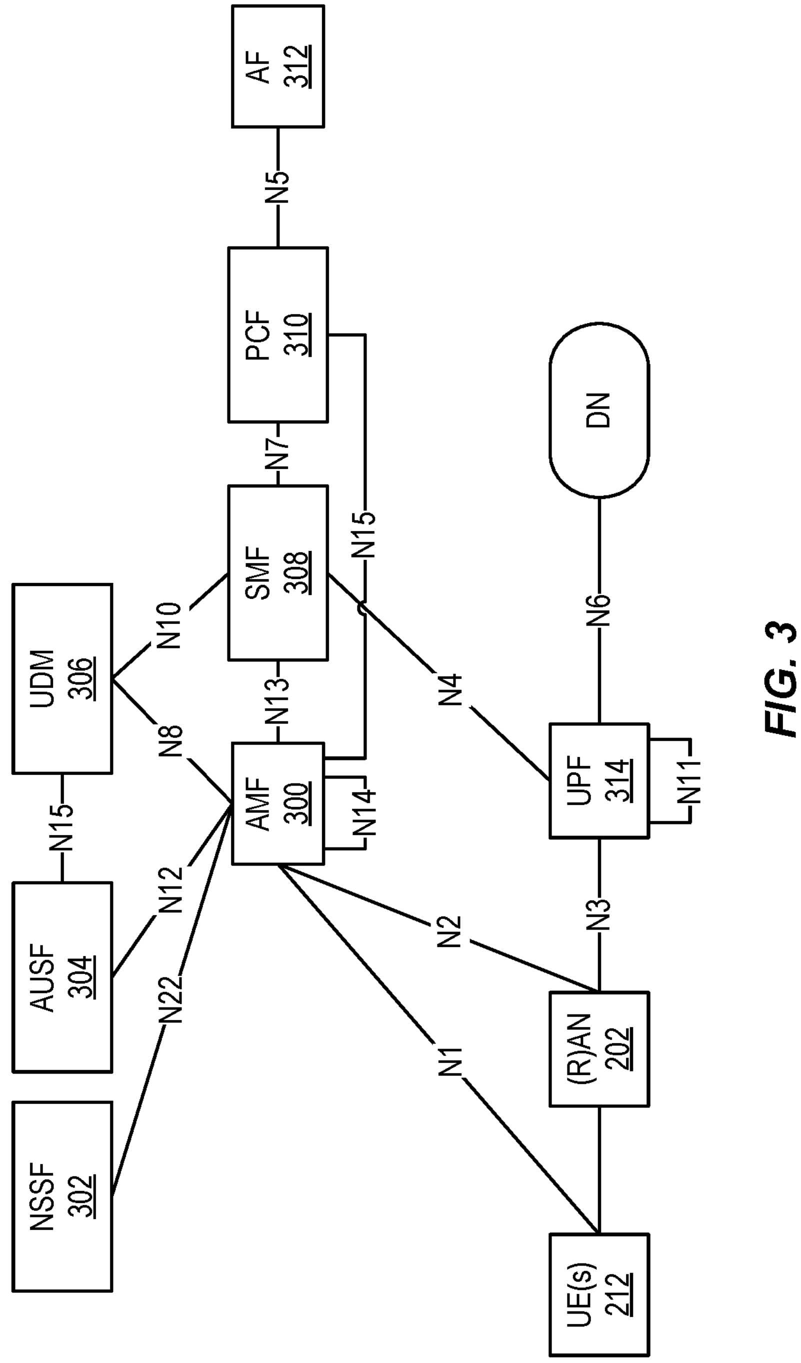
FIGS. 3 and 4 illustrate example embodiments in which the cellular communication system of FIG. 3 is a Fifth Generation (5G) System (5GS)

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of UEs 212 connected to either a RAN 202 or an Access Network (AN) as well as an AMF 300. Typically, the R(AN) 202 comprises base stations, e.g., such as eNBs or gNBs or similar. Seen from the core network side, the 5GC NFs shown in FIG. 3 include a NSSF 302, an AUSF 304, a UDM 306, the AMF 300, a SMF 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating UP and CP. The UP carries user traffic while the CP carries signaling in the network. In FIG. 3, the UPF 314 is in the UP and all other NFs, i.e., the AMF 300, SMF 308, PCF 310, AF 312, NSSF 302, AUSF 304, and UDM 306, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 300 and SMF 308 are independent functions in the CP. Separated AMF 300 and SMF 308 allow independent evolution and scaling. Other CP functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 4:
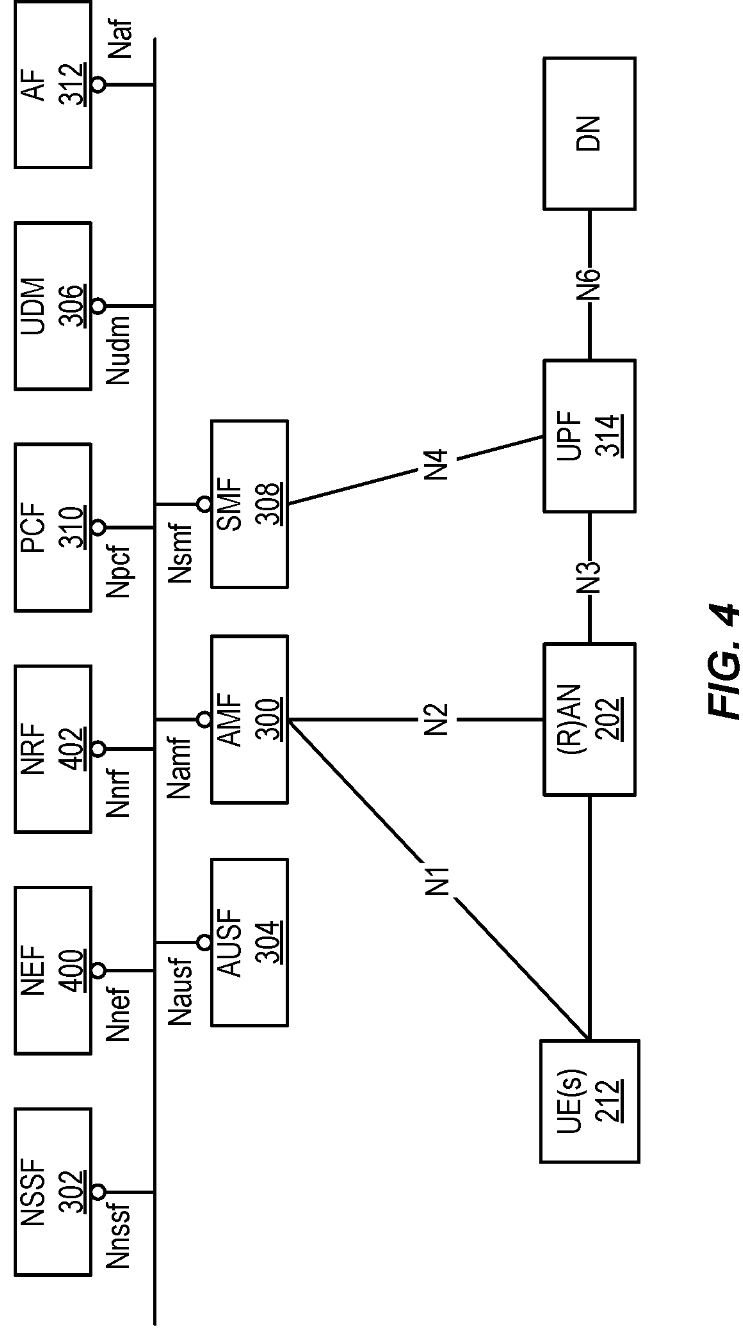

FIG. 4 illustrates a 5G network architecture using service-based interfaces between the NFs in the CP, instead of the point-to-point reference points/interfaces used in the 5G network architecture of FIG. 3. However, the NFs described above with reference to FIG. 3 correspond to the NFs shown in FIG. 4. The service(s) and the like that a NF provides to other authorized NFs can be exposed to the authorized NFs through the service-based interface. In FIG. 4 the service based interfaces are indicated by the letter "N" followed by the name of the NF, e.g., Namf for the service based interface of the AMF 300 and Nsmf for the service based interface of the SMF 308, and so forth. The NEF 400 and the NRF 402 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, and the like. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support Quality of Service (QoS). Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of the UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 5:
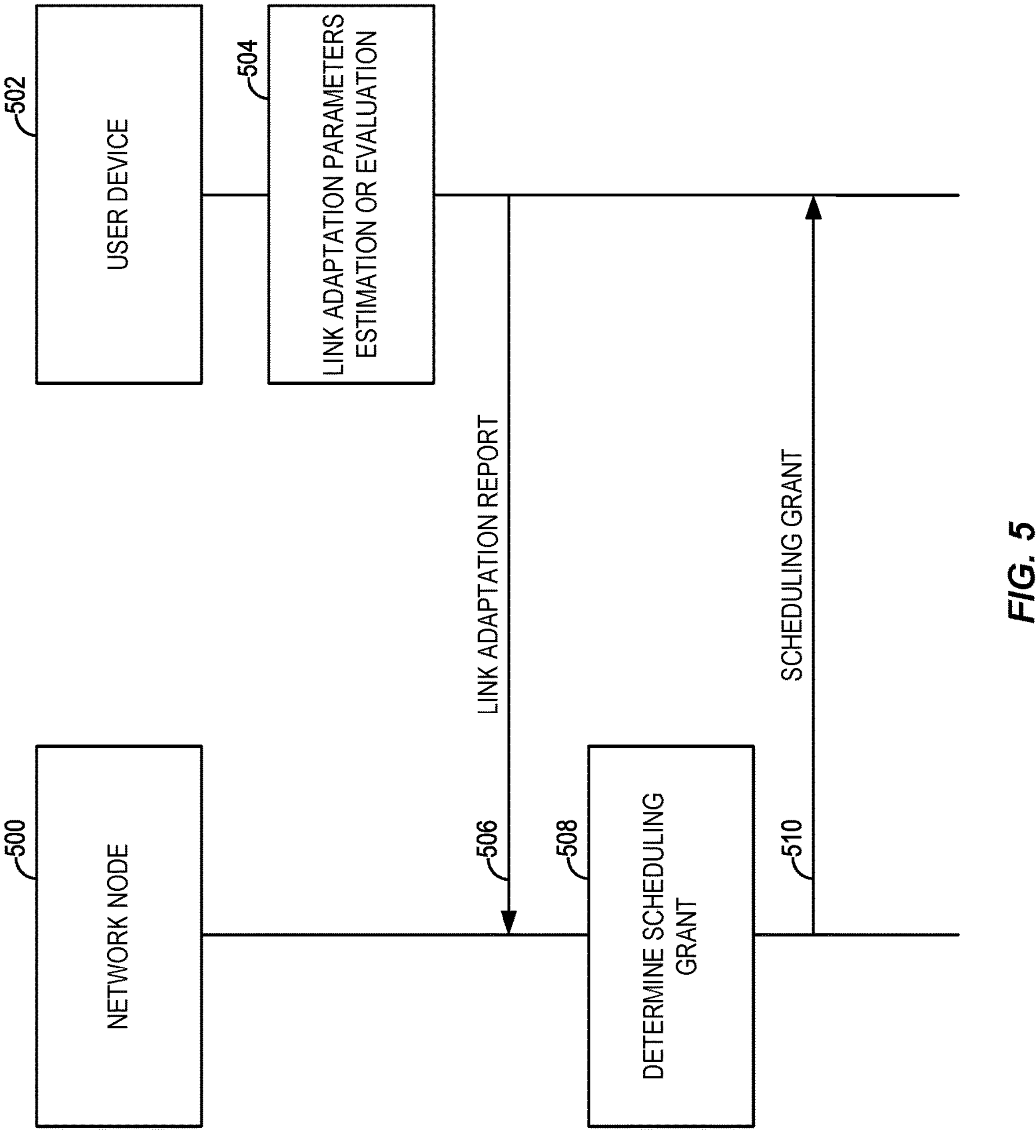
FIG. 5 illustrates exemplary communication flows and operations for a network node to optimize the selection of radio resources and transmission format for a communication session with a user device, according to some embodiments disclosed herein.

The subject matter disclosed herein provides computer implemented methods and systems for enabling a radio network node to optimize the selection of radio resources (such as, PRBs, PRB groups, sub-bands, and the like) and transmission format (such as MCS, code rate, transport block size, and the like) for a communication session with a user device based on one or more MCS preference reported by the user device. In some embodiments, a computer implemented method executed by a network node in a communication network for optimizing the selection of radio resources and transmission format for a communication session with a user device comprises receiving a link adaptation report message from the user device comprising a link adaptation report, determining a scheduling grant comprising an allocation of radio resources for the user device based on the link adaptation report reported MCS index, and transmitting the scheduling grant to the user device. FIG. 5 shows an illustration of the method. In FIG. 5, a network node 500, upon receiving a link adaptation report message from a user device 502, can determine an allocation of resources for the user device based on the link adaptation report.

In some embodiments, the link adaptation report may comprise a set of one or more link adaptation parameters estimated or preferred by the user device for link adaptation in a communication session with the network node. In addition, the link adaptation report may comprise an indicator indicating whether the reported set of estimated or preferred link adaptation parameters is associated with uplink or downlink transmission. Examples of estimated or preferred link adaptation parameters that could be reported by the user device include one or more of the following:

Modulation order;

MCS index; and

Code rate.

In addition, the link adaptation report received from the user device may comprise, for one or more of the estimated/preferred link adaptation parameter, one or more additional information in the following:

The associated probability of success;

The associated uncertainty in the estimated probability of success;

The associated confidence interval for the estimated probability of success.

In some embodiments, the link adaptation report may comprise a set of one or more link adaptation parameters to be prioritized with the associated priority value. For instance, the user device may report to the network node a group of preferred/estimated MCS indices and the associated priority values. In some embodiments, the link adaptation report may comprise at least one MCS index value estimated or preferred by the user device for communication, in downlink or uplink, with the network node. Some embodiments may provide that the link adaptation report may comprise at least one modulation order value estimated or preferred by the user device for communication, in downlink or uplink, with the network node. According to some embodiments, the link adaptation report may comprise at least one code rate value estimated or preferred by the user device for communication, in downlink or uplink, with the network node.

Therefore, the network node may use the reported link adaptation parameters values estimated or preferred by the user device, either in isolation or combined with other information available at the network node, for determining an allocation of radio resources for a communicating with the user device. In some embodiments, the network node selects one of the reported MCS index values reported by the user device for determining an allocation of physical resource blocks, code rate and transport block size for communicating with the user device, either in uplink or downlink, in a transmission time interval. In another example, the network node may combine the preference or estimates of MCS index values reported by the user device with another channel state information (CSI), such as the channel quality indicator (CQI), the rank and the precoding matrix indicator (PMI), for determining an allocation of radio resources for a communicating with the user device.

According to some embodiments, when the user device is capable of transmitting (in uplink) or receiving (in downlink) multiple spatial layers with a MIMO transmission, the link adaptation report may comprise one or more set of estimated or preferred link adaptation parameters, with each set of link adaptation parameter associated with a transmission rank value. Examples of link adaptation parameters that can be reported in association with a specific transmission rank may comprise one or more of the following:

- Modulation order;
- MCS index;
- Code rate.

In some embodiments, the link adaptation report may comprise a set of at least one MCS index values associated with different transmission rank values. For instance, one set of preferred or estimated one MCS index values associated with rank-1 transmission (i.e., in case the network node communicates with the user device using a single spatial layer), one set of preferred or estimated one MCS index values associated with rank-2 transmission (i.e., in case the network node communicates with the user device using two spatial layers), and so on. This enables the network node to jointly optimize the MIMO transmission parameters (such as the transmission rank or number of spatial layers) and the selection of the MCS index when allocating radio resources to communicate with the user device. In some embodiments, the link adaptation report may comprise a range of MCS index values associated with different transmission rank values. The range of MCS index values associated with a transmission rank may be represented, for instance in one of the following methods:

- By the first MCS index value and the last MCS index value of the range. For instance, to indicate the range of MCS index values [9, 10, 11, 12], the user device may report the first and the last MCS index value of the range, i.e., 9 and 12;
- By the first (or the last) MCS index value and the length of the of MCS index values range. Following the previous example, the range [9, 10, 11, 12], the user device may report the first (or the last) and the range length 4. An additional information bit may be transmitted to differentiate between the two solutions, for instance by associating value 1 if the reported MCS index value refers to the first MCS index value of the range, or zero if it represents the last MCS index value of the range.

In some embodiments, the link adaptation report may comprise a set of at least one modulation order value and/or a set of at least one coding rate values associated with different transmission rank values. For instance, one set of preferred or estimated one modulation order or coding rate values associated with rank-1 transmission (i.e., in case the network node communicates with the user device using a single spatial layer), one set of preferred or estimated modulation order or coding rate values associated with rank-2 transmission (i.e., in case the network node communicates with the user device using two spatial layers), and so on. In some embodiments, the link adaptation report may comprise a range of modulation order values and/or a range of coding rate values associated with different transmission rank values.

In some embodiments, the link adaptation report may comprise link adaptation parameters reported for one or more frequency bands. In addition, the link adaptation report may comprise link adaptation information (such as MCS index value, modulation order, code rate, and the like) reported according to one or more of the following granularity in frequency domain:

- Wideband;
- per sub-band;
- per physical resource block (PRB);
- per resource block group (RBG), wherein an RBG may comprise a group of PRBs;
- per bandwidth part or per bandwidth segment.

Therefore, in case of wide-band reporting for a certain frequency band, each of the reported estimate or preferred link adaptation parameter value applies to the entire frequency band. On the other hand, in the case of a finer granularity of the link adaptation report in frequency domain for a certain frequency band, the reported link adaptation information may be associated with a different portion of the frequency band, such as a sub-band, a PRB, an RBG, a bandwidth part or a bandwidth segment, according to the configured reporting granularity. In some embodiments, the link adaptation report may comprise MCS index values and/or rank information reported per sub-band, per PRB, per RBG, per bandwidth part or per bandwidth segment.

In some embodiments, the link adaptation report may comprise link adaptation information/parameters reported according to one or more of the following granularities in time domain:

- per transmission time interval (i.e., one shot);
- per transmission time window (i.e., the reported information is associated with a certain time interval).

It is to be understood that a combination of one or more embodiments disclosed herein allows the link adaptation report to carry information associated with different combination of granularity, such as time, frequency, and space.

Figure 6:
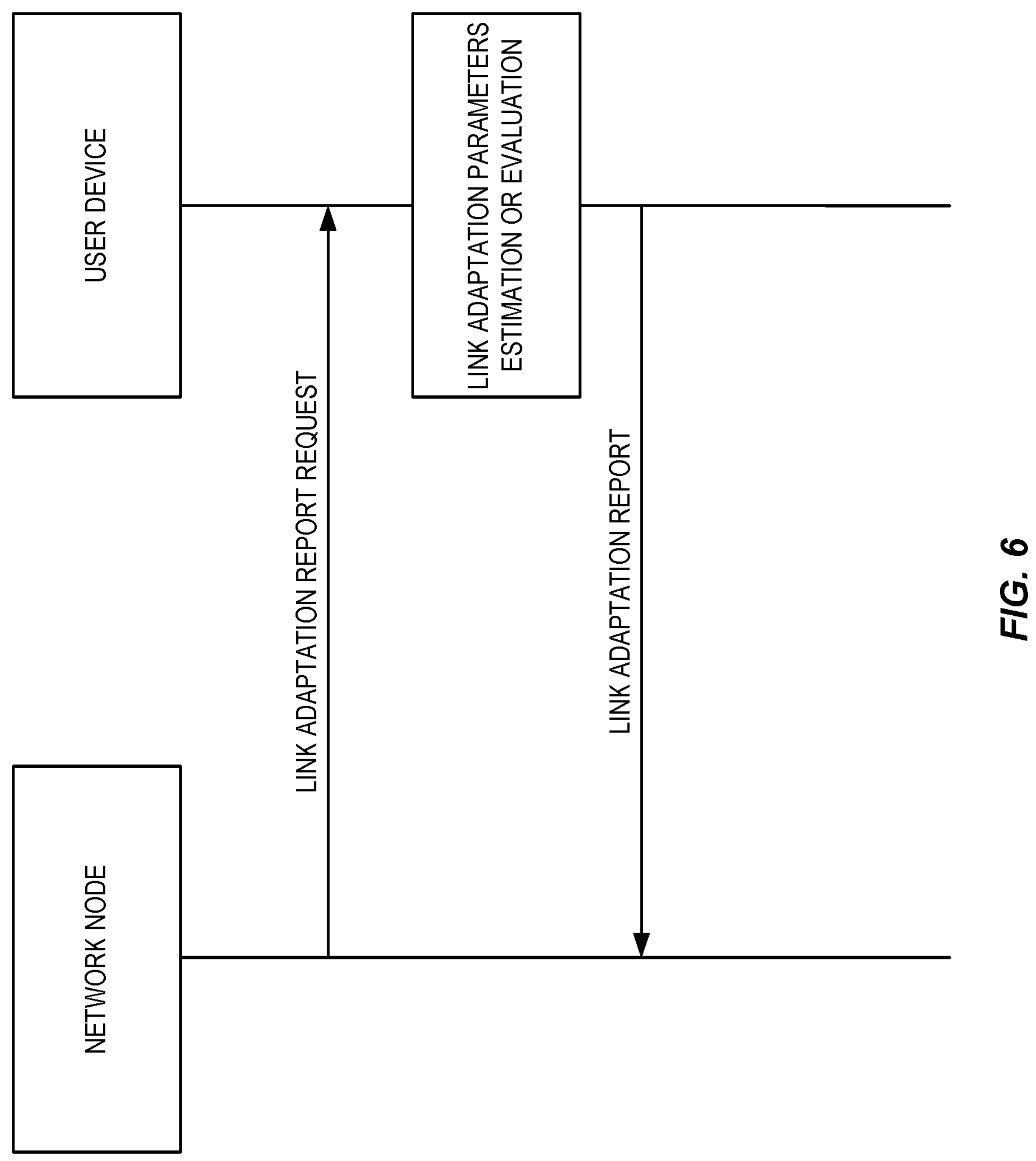
FIG. 6 illustrates exemplary communication flows and operations for a network node to transmit a link adaptation report request message to a user device configuring the user device for link adaptation reporting, according to some embodiments disclosed herein.

In some embodiments, the network node may further be configured to transmit a link adaptation report request message to the user device configuring the user device for link adaptation reporting. This is illustrated in FIG. 6, which shows a link adaptation report message transmitted from the network node to the user device configuring the user device to report assistance information for link adaptation. The link adaptation report request message may comprise one or more of the following information elements for configuring the reporting of assistance information associated with link adaptation from the user device:

- An indication to start/stop/pause or resume link adaptation reporting;
- An indication of the type of link adaptation reporting, such as periodic reporting, aperiodic reporting (one-shot), or event triggered reporting;
- An indication of at least one periodicity for link adaptation reporting;
- An indication of the information to be reported for link adaptation, such as one or more of the following estimated or preferred value associated with at least one link adaptation parameter:
  - Modulation order;
  - MCS index;
  - Code rate;
- For one or more of the link adaptation information/parameter to be reported, an indication of the associated probability of success;
- For one or more of the link adaptation information/parameter to be reported, an indication of the associated uncertainty in the estimated probability of success;
- For one or more of the link adaptation information/parameter to be reported, an indication of the associated confidence interval for the estimated probability of success;
- An indication of a group of the link adaptation information/parameter to be prioritized with the associated priority value. For instance, the network node may configure to report a group of preferred/estimated MCS indices and the associated priority values;
- For each link adaptation information/parameter to be reported, an indication of one or more granularity in frequency domain for reporting the associated preferred or estimated values, such as the following:
  - Wideband reporting;
  - per sub-band reporting;
  - per physical resource block (PRB) reporting;
  - per resource block group (RBG) reporting, wherein an RBG may comprise a group of PRBs;
  - per bandwidth part reporting;
  - per bandwidth segment reporting;
- For each reported link adaptation information/parameter to be reported, an indication of one or more granularity in spatial domain for reporting the associated preferred or estimated values, such as the following:
  - A single value;
  - One value for each transmission rank that the user device can support;
  - A range of values for each transmission rank supported by the user device;
- For each link adaptation information/parameter to be reported, an indication of at least one granularity in time domain for reporting the associated preferred or estimated values, such as the following:
  - per transmission time interval (i.e., one shot);
  - per transmission time window (i.e., the reported information is associated with a certain time interval);
- For each link adaptation information/parameter to be reported, an indicator of which downlink reference signals to use for estimating link adaptation parameters, such as one or more of reference signals in the group of:
  - Common Reference Signals (CRS);
  - Channel State Information Reference Signals CSI-RS;
  - Synchronization Signal Block (SSB) reference signal.

Computer implemented methods and systems are also disclosed herein that enable a user device in a communication network to optimize the selection of radio resources and transmission format for a communication session with a network node. In some embodiments, the computer implemented method comprises determining a link adaptation report for communicating with a network node, and transmitting a link adaptation report message to a network node comprising a link adaptation report. The method is illustrated in FIG. 5, discussed above.

In some embodiments, illustrated in FIG. 6 as discussed above, the user device may further receive a link adaptation report request message from a network node configuring the user device for link adaptation reporting, and determine a link adaptation report for communicating with a network node based on the link adaptation report request message. the link adaptation report request message may comprise one or more information elements for configuring the reporting of assistance information associated with link adaptation as well how the reporting should be done. for instance, the link adaptation report request message may additionally indicate how frequently a link adaptation report should be transmitted by the user device to the network node, such as periodically, aperiodically, event-triggered, and the like. Additionally, for each link adaptation information/parameter configured to be reported, the link adaptation report request message may additionally indicate the time, frequency, and spatial granularity to be used for the reporting, as disclosed with respect to embodiments discussed above.

Figure 7:
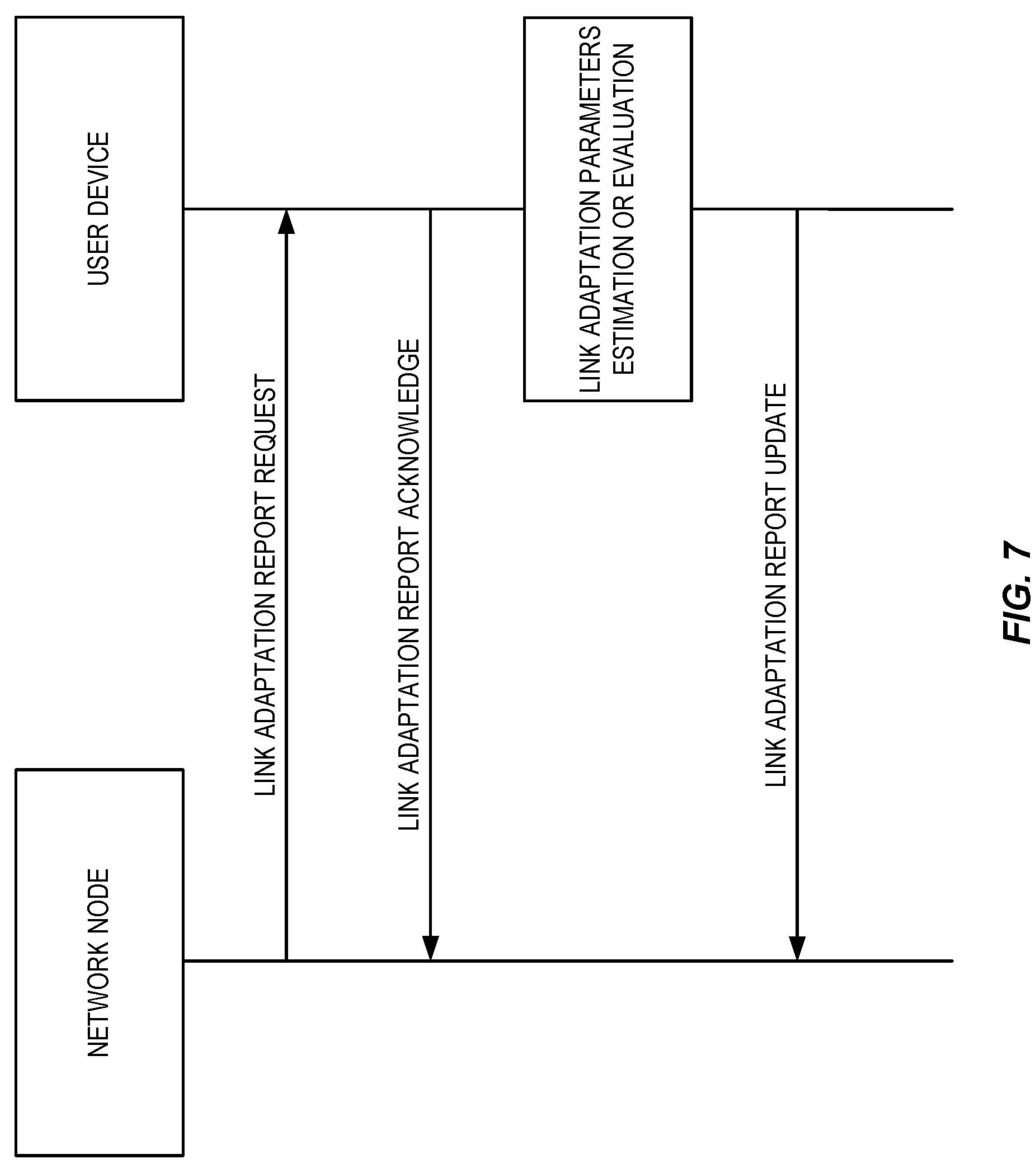
FIG. 7 illustrates exemplary communication flows and operations for successful (or partial) initialization of link adaptation reporting at a user device upon receiving a link adaptation report request message from a network node, according to some embodiments disclosed herein.
Figure 8:
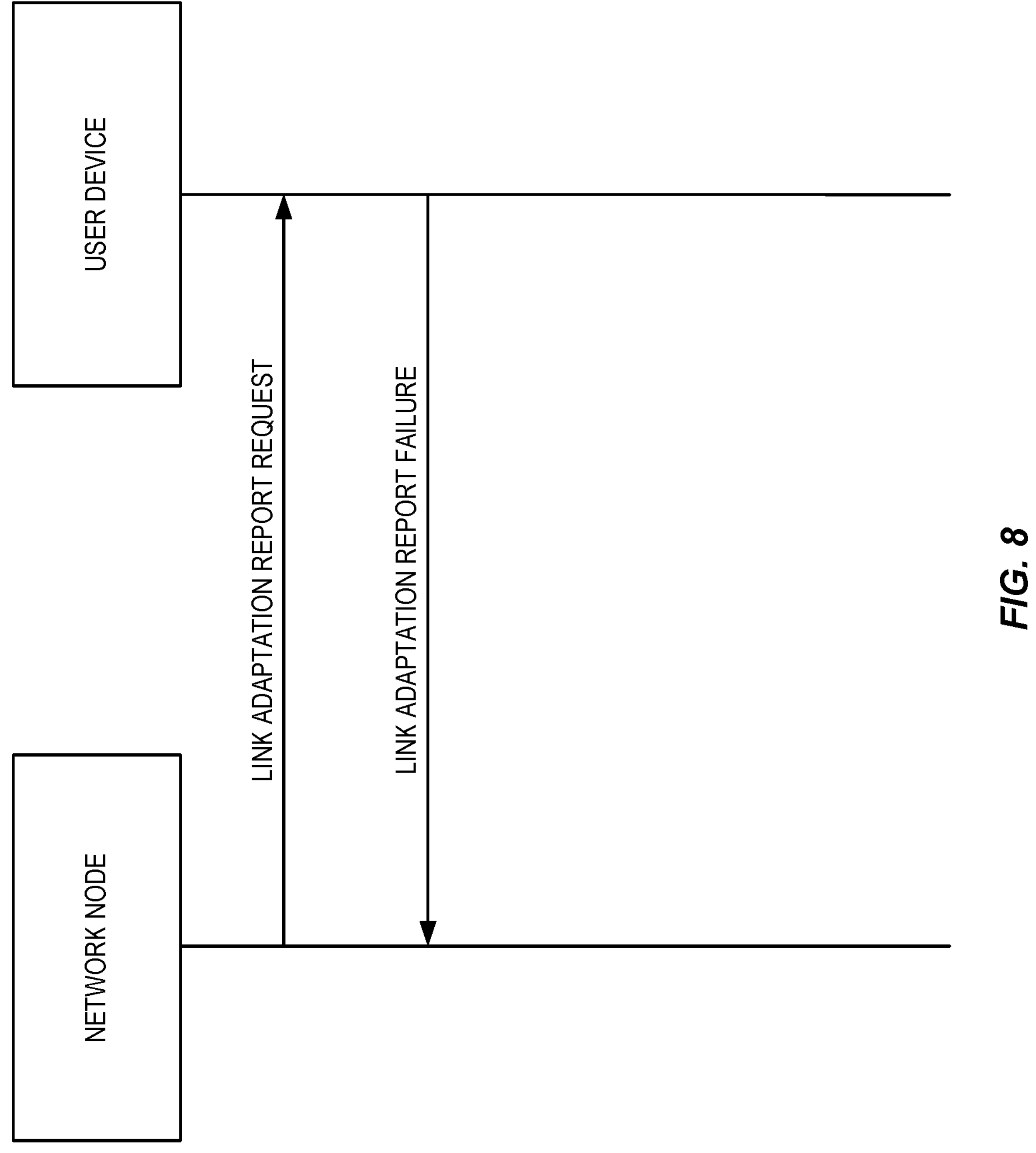
FIG. 8 illustrates exemplary communication flows and operations for unsuccessful initialization of link adaptation reporting at a user device upon receiving a link adaptation report request message from a network node, according to some embodiments disclosed herein.

In some embodiments, illustrated in FIGS. 7 and 8, in response to a link adaptation report request message received from a network node, the user device may further transmit a link adaptation report acknowledge message in case of a successful (or partial) initialization of a link adaptation reporting procedure, or may transmit a link adaptation report failure message in case of an unsuccessful initialization of a link adaptation reporting procedure. In particular, FIG. 7 illustrates an embodiment of successful (or partial) initialization of link adaptation reporting at the user device upon receiving link adaptation report request message from a network node. in this case, the user device may transmit a link adaptation report acknowledge message to indicating a successful initialization of a link adaptation reporting procedure. in case of a successful initialization, the user device may indicate that it fully or only partly acknowledges the configuration of the link adaptation reporting.

According to some embodiments, in case of a partial successful initialization of the link adaptation reporting procedure, the link adaptation report request acknowledge message transmitted by the user device may additionally indicate one or more of the following:

- A list of link adaptation information or parameters that can be reported;
- The periodicity with which link adaptation reports can be transmitted to the network node;
- The frequency domain granularity with which link adaptation information/parameters can be reported;
- The time domain granularity with which link adaptation information/parameters can be reported;
- The spatial domain granularity with which link adaptation information/parameters can be reported.

FIG. 8 illustrates an embodiment of unsuccessful initialization of link adaptation reporting at the user device upon receiving a link adaptation report request message from a network node. in this case, the link adaptation report failure message may additionally indicate the cause of the initialization failure.

Some embodiments may provide that the user device determines one or more link adaptation parameter values based on a machine learning model/function and/or a machine learning algorithm. In some embodiments, a machine learning model/function or a machine learning algorithm determines a mapping from one or more information elements into an estimated or preferred value of at least one link adaptation parameter. Information elements used by the machine learning model/function or the machine learning algorithm may represent the state of the communication network, the state of the radio environment, the state of the user device, and combination thereof.

In some embodiments, a machine learning model/function used for determining one or more link adaptation parameter value may be one or more of the following:

A feedforward neural network;

A recurrent neural network;

A convolutional neural network;

An ensemble of neural networks, such as feedforward neural networks, recurrent neural networks, convolutional neural networks or a combination thereof;

A decision tree;

A decision forest;

A linear regression model;

A nonlinear regression model;

A learning graph.

According to some embodiments, a machine learning algorithm used for determining one or more link adaptation parameter value may be one or more of the following:

A multi-armed bandit;

A contextual multi-armed bandit;

A classifier;

A regression function followed by a selection function, such as an argmax( ) function, an argmin( ) function;

A reinforcement learning algorithm.

Figure 9:
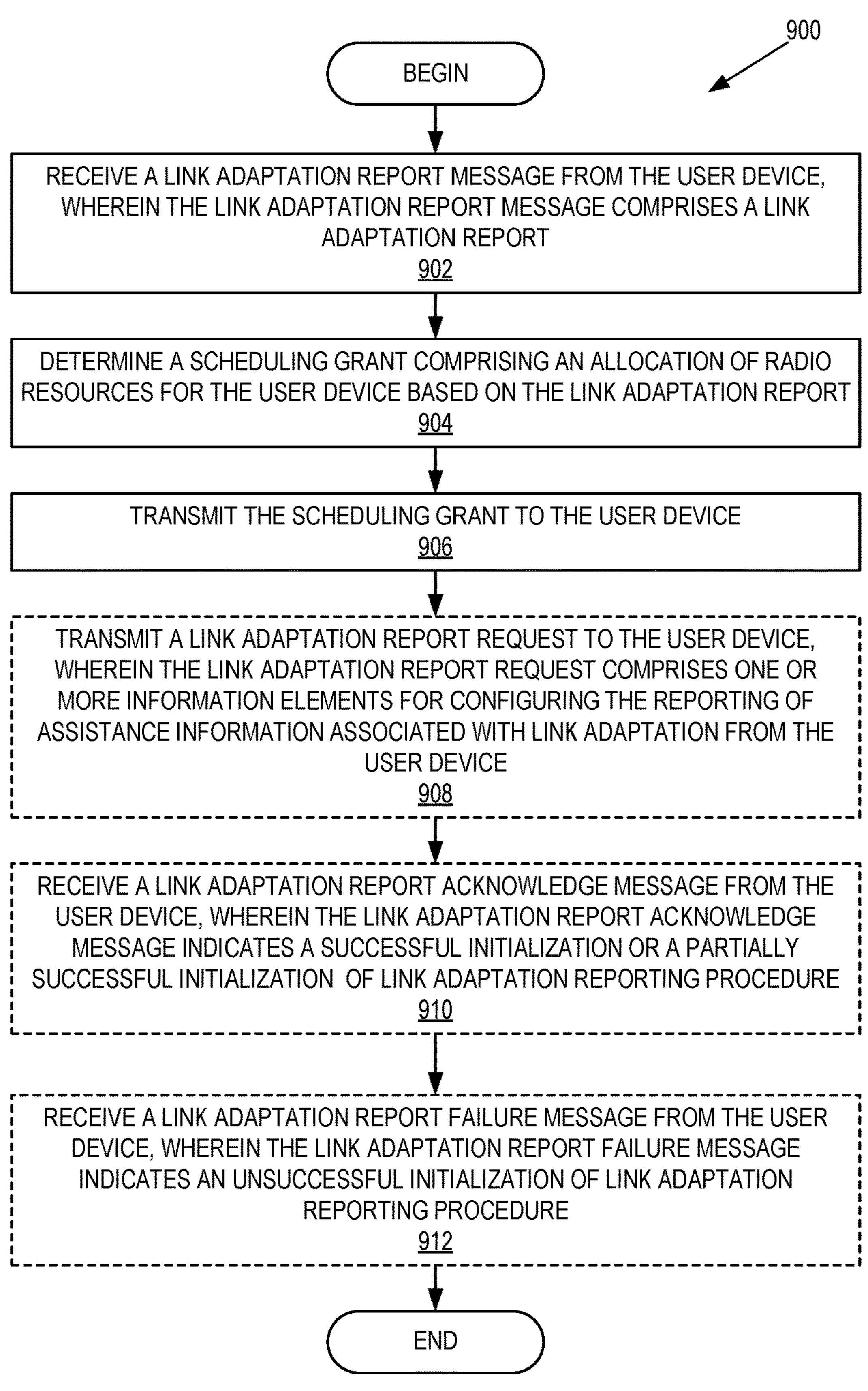
FIG. 9 illustrates exemplary operations of a network node for optimizing the selection of radio resources and transmission format for a communication session with a user device according to some embodiments disclosed herein.

FIG. 9 provides a flowchart 900 illustrating exemplary operations of the network node for optimizing the selection of radio resources and transmission format for a communication session with a user device. In FIG. 9, operations begin with the network node receiving a link adaptation report message from the user device, wherein the link adaptation report message comprises a link adaptation report (block 902). The network node determines a scheduling grant comprising an allocation of radio resources for the user device based on the link adaptation report (block 904). The network node transmits the scheduling grant to the user device (block 906). In some embodiments, the network node transmits a link adaptation report request to the user device, wherein the link adaptation report request comprises one or more information elements for configuring the reporting of assistance information associated with link adaptation from the user device (block 908). Some embodiments provide that the network node receives a link adaptation report acknowledge message from the user device, wherein the link adaptation report acknowledge message indicates a successful initialization or a partially successful initialization of link adaptation reporting procedure (block 910). According to some embodiments, the network node receives a link adaptation report failure message from the user device, wherein the link adaptation report failure message indicates an unsuccessful initialization of link adaptation reporting procedure (block 912).

FIG. 10 provides a flowchart 1000 illustrating exemplary operations of the user device to optimize the selection of radio resources and transmission format for a communication session with a network node. In FIG. 10, operations begin with the user device determining a link adaptation report for communicating with the network node (block 1002). The user device transmits a link adaptation report message to the network node, wherein the link adaptation report message comprises the link adaptation report (block 1004). The user device in some embodiments receives, from the network node, a scheduling grant comprising an allocation of radio resources for the user device based on the link adaptation report (block 1006). Some embodiments provide that the user device receives, from the network node, a link adaptation report request to configure link adaptation reporting for the user device (block 1008). According to some embodiments, the user device determines one or more link adaptation parameter values based on machine learning (ML) (block 1010). In some embodiments, the user device transmits a link adaptation report acknowledge message to the network node, the link adaptation report acknowledge message indicating a successful initialization or a partially successful initialization of link adaptation reporting procedure (block 1012). Some embodiments may provide that the user device transmits a link adaptation report failure message to the network node, the link adaptation report failure message indicating an unsuccessful initialization of link adaptation reporting procedure (block 1014).

Figure 11:
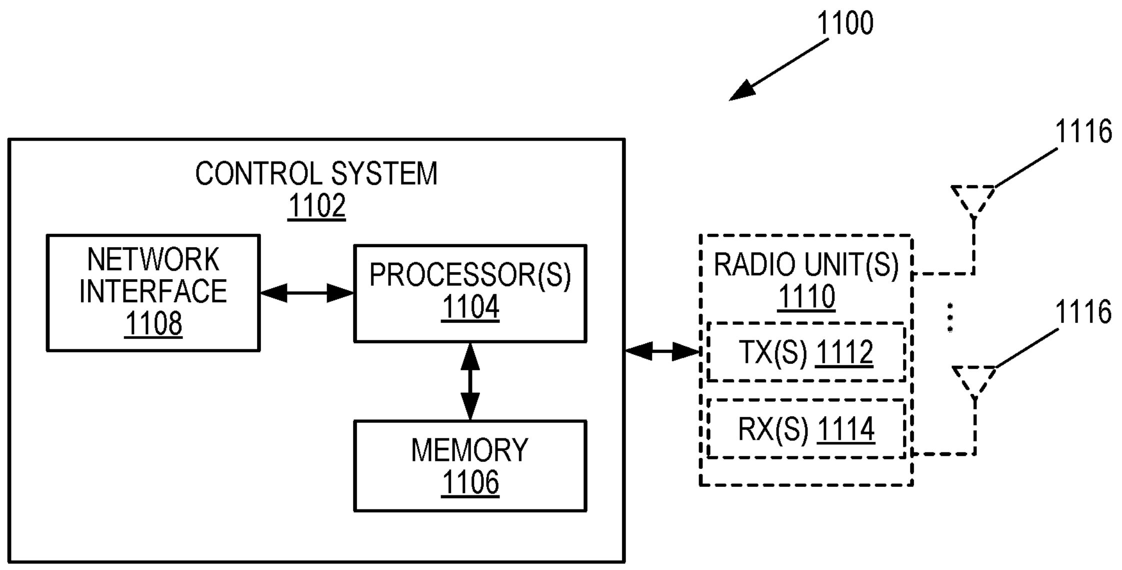
FIG. 11 illustrates a radio access node according to some embodiments disclosed herein.

FIG. 11 is a schematic block diagram of a radio access node 1100 according to some embodiments of the present disclosure. Optional features are represented by dashed boxes. The radio access node 1100 may be, for example, a base station 202 or 206 or a network node that implements all or part of the functionality of the base station 202 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
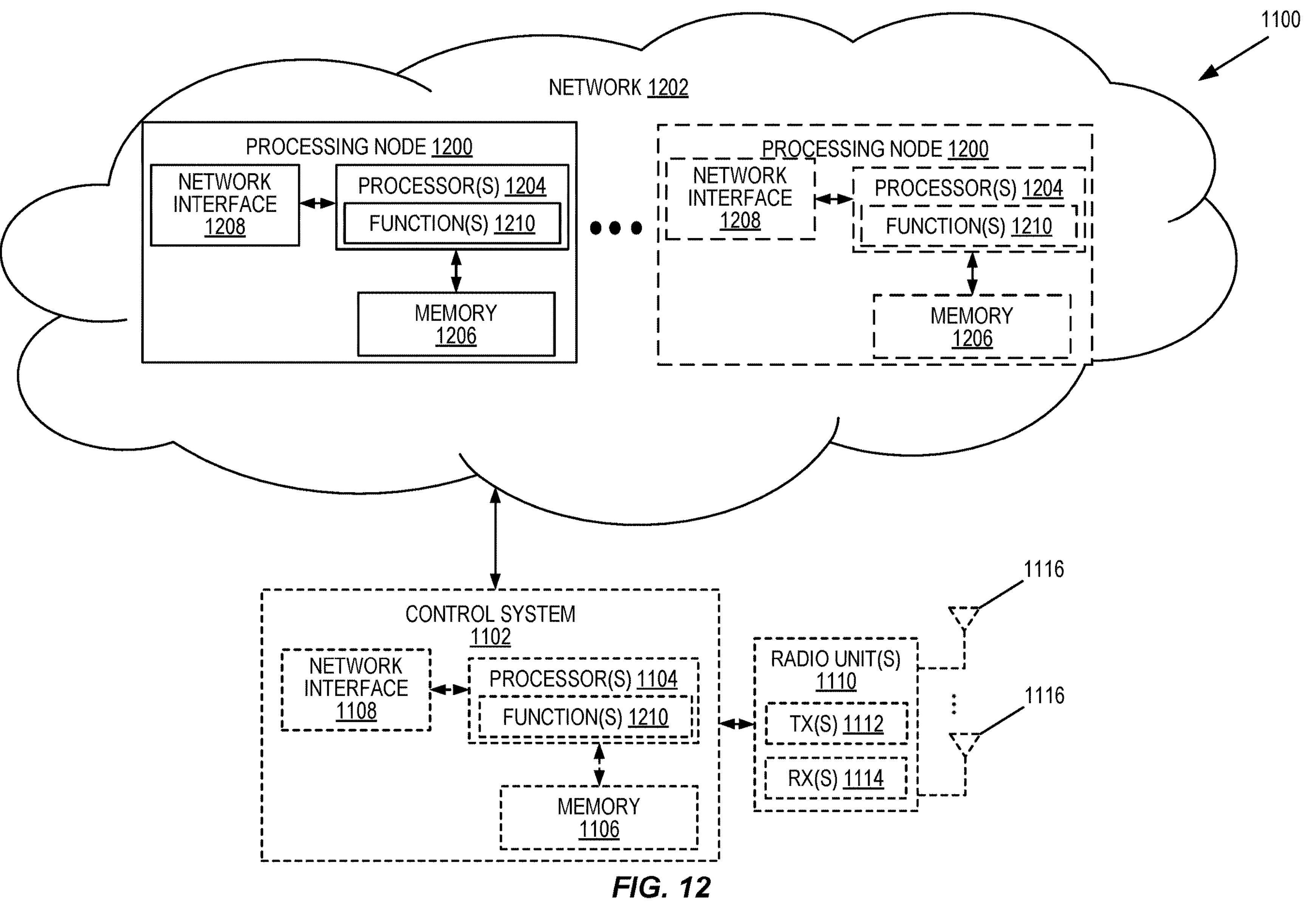
FIG. 12 illustrates a virtualized embodiment of the radio access node of FIG. 11 according to some embodiments disclosed herein.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s)

1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
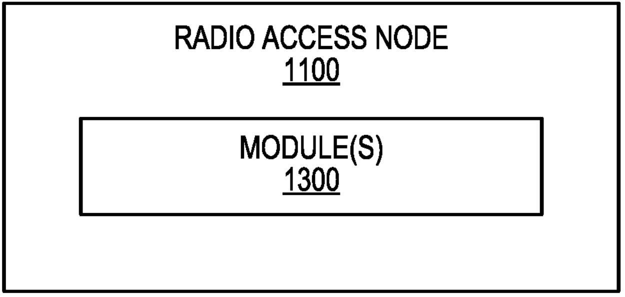
FIG. 13 illustrates the radio access node of FIG. 11 according to some other embodiments disclosed herein.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
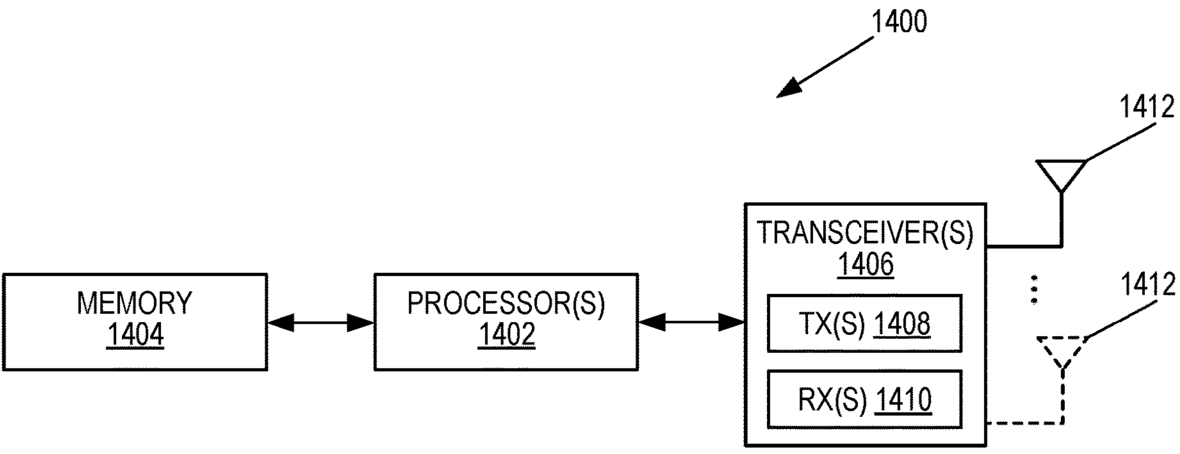
FIG. 14 illustrates a UE according to some embodiments disclosed herein.

FIG. 14 is a schematic block diagram of a wireless communication device 1400 according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), and the like.

In some embodiments, a computer program including instructions which, when executed by at least one processor, causes the at least one processor to carry out the functionality of the wireless communication device 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
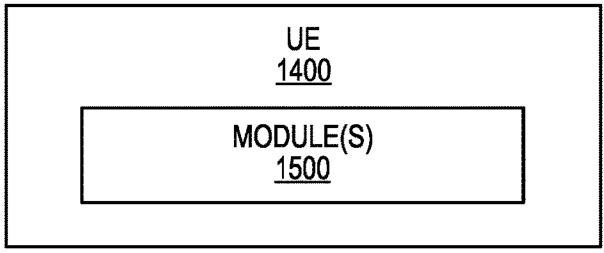
FIG. 15 illustrates the UE of FIG. 14 according to some other embodiments disclosed herein.

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, and the like. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., some embodiments may perform the operations in a different order, combine certain operations, overlap certain operations, and the like).

Some example embodiments of the present disclosure are as follows:

Embodiment 1: A method performed by a network node of a telecommunications network for optimizing selection of radio resources and transmission format for a communication session with a user device, the method comprising:

receiving, by the network node, a link adaptation report message from the user device, wherein the link adaptation report message comprises a link adaptation report;

determining a scheduling grant comprising an allocation of radio resources for the user device based on the link adaptation report; and transmitting the scheduling grant to the user device.

Embodiment 2: The method of embodiment 1, wherein the link adaptation report comprises one or more of a set of one or more link adaptation parameters estimated or preferred by the user device for link adaptation in a communication session with the network node.

Embodiment 3: The method of embodiment 2, wherein the link adaptation report further comprises an indicator indicating whether the one or more link adaptation parameters is associated with uplink or downlink transmission Embodiment 4: The method of embodiment 2, wherein the one or more link adaptation parameters comprises one or more of a modulation order and an MCS scheme index.

Embodiment 5: The method of embodiment 2, wherein the link adaptation report further comprises, for one or more of the link adaptation parameters, one or more indicators of an associated estimated probability of success, an associated uncertainty in the estimated probability of success, and/or an associated confidence interval for the estimated probability of success.

Embodiment 6: The method of embodiment 2, wherein the link adaptation report further comprises a set of the one or more link adaptation parameters to be prioritized with an associated priority value.

Embodiment 7: The method of embodiment 1, wherein the link adaptation report comprises one or more sets of at least one MCS index value, wherein each set is associated with a different transmission rank value.

Embodiment 8: The method of embodiment 1, wherein:

the link adaptation report comprises one or more ranges of MCS index values; and each range is associated with a different transmission rank value.

Embodiment 9: The method of embodiment 1, wherein the link adaptation report comprises one or more sets of at least one modulation order value and/or one or more sets of at least one coding rate value, wherein each set is associated with a different transmission rank value.

Embodiment 10: The method of embodiment 1, wherein:

the link adaptation report comprises one or more ranges of modulation order values and/or one or more ranges of coding rate values; and each range is associated with a different transmission rank value.

Embodiment 11: The method of embodiment 1, wherein the link adaptation report comprises link adaptation parameters reported for one or more frequency bands.

Embodiment 12: The method of embodiment 11, wherein the link adaptation report further comprises link adaptation information reporting according to one or more of wideband, per sub-band, per physical resource block (PRB), per resource block group (RBG), per bandwidth part, and per bandwidth segment in a frequency domain.

Embodiment 13: The method of embodiment 1, wherein the link adaptation report comprises link adaptation information reported according to a granularity in a time domain, wherein the granularity is per transmission time interval and/or per transmission time window.

Embodiment 14: The method of embodiment 1, further comprising transmitting a link adaptation report request to the user device, wherein the link adaptation report request comprises one or more information elements for configuring the reporting of assistance information associated with link adaptation from the user device.

Embodiment 15: The method of embodiment 14, wherein the one or more information elements comprises one or more indications of a type and frequency of reporting.

Embodiment 16: The method of embodiment 15, wherein the type and frequency of reporting comprises periodic reporting or aperiodic reporting.

Embodiment 17: The method of embodiment 14, wherein the one or more information elements comprises a type of link adaptation information reported.

Embodiment 18: The method of embodiment 17, wherein the type of link adaptation information reported comprises one or more of estimated modulation order, preferred modulation order, estimated MCS index, preferred MCS index, estimated code rate, preferred code rate, transport block size, and type of retransmission method.

Embodiment 19: The method of embodiment 14, wherein the one or more information elements comprises a granularity of the reported link adaptation information in a time domain, and/or a frequency domain, and/or a spatial domain.

Embodiment 20: The method of embodiment 14, wherein the one or more information elements comprises a type of reference signals that the user device can use for determining link adaptation information.

Embodiment 21: The method of embodiment 14, wherein the one or more information elements comprises one or more indications to start, stop, pause, resume and/or modify link adaptation reporting.

Embodiment 22: The method of embodiment 14, wherein the link adaptation report request comprises a list of time-frequency resources that the user device can use to transmit the link adaptation report.

Embodiment 23: The method of embodiment 1, wherein determining the scheduling grant comprises selecting a reported MCS index value reported by the user device for determining an allocation of physical resource blocks, code rate, and transport block size for communicating with the user device, either in uplink or downlink, in a transmission time interval.

Embodiment 24: The method of embodiment 1, wherein determining the scheduling grant comprises combining a preference or estimate of MCS index values reported by the user device with another channel state information (CSI), wherein the CSI comprise one or more of a channel quality indicator (CQI), a rank, and a precoding matrix indicator (PMI) for determining an allocation of radio resources for communicating with the user device.

Embodiment 25: The method of embodiment 1, further comprising receiving, by the network node, a link adaptation report acknowledge message from the user device, wherein the link adaptation report acknowledge message indicates a successful initialization or a partially successful initialization of link adaptation reporting procedure.

Embodiment 26: The method of embodiment 1, further comprising receiving, by the network node, a link adaptation report failure message from the user device, wherein the link adaptation report failure message indicates an unsuccessful initialization of link adaptation reporting procedure.

Embodiment 27: A network node of a telecommunications network, adapted to:

receive, by the network node, a link adaptation report message from a user device, wherein the link adaptation report update comprises a link adaptation report;

determine a scheduling grant comprising an allocation of radio resources for the user device based on a reported modulation and coding scheme (MCS) index of the link adaptation report; and transmit the scheduling grant to the user device.

Embodiment 28: The network node of embodiment 27, further adapted to perform the method of any one of embodiments 2 to 26.

Embodiment 29: A network node, comprising one or more transmitters;

one or more receivers; and processing circuitry associated with the one or more transmitters and the one or more receivers, the processing circuitry configured to cause the network node to:

receive, by the network node, a link adaptation report message from a user device, wherein the link adaptation report update comprises a link adaptation report;

determine a scheduling grant comprising an allocation of radio resources for the user device based on a reported modulation and coding scheme (MCS) index of the link adaptation report; and transmit the scheduling grant to the user device.

Embodiment 30: The network device of embodiment 29, further adapted to perform the method of any one of embodiments 2 to 26.

Embodiment 31: A method performed by a user device of a telecommunications network for optimizing the selection of radio resources and transmission format for a communication session with a network node, the method comprising:

determining a link adaptation report for communicating with the network node; and transmitting a link adaptation report message to the network node, wherein the link adaptation report message comprises the link adaptation report.

Embodiment 32: The method of embodiment 31, further comprising receiving, from the network node, a scheduling grant comprising an allocation of radio resources for the user device based on the link adaptation report.

Embodiment 33: The method of embodiment 31, further comprising receiving, from the network node, a link adaptation report request to configure link adaptation reporting for the user device;

wherein determining the link adaptation report for communicating with the network node is based on the link adaptation report request.

Embodiment 34: The method of embodiment 33, wherein the link adaptation report request comprises one or more information elements for configuring the reporting of assistance information associated with link adaptation and reporting.

Embodiment 35: The method of embodiment 34, wherein the one or more information elements comprises one or more indications of a type and frequency of reporting.

Embodiment 36: The method of embodiment 35, wherein the type and frequency of reporting comprises periodic reporting or aperiodic reporting.

Embodiment 37: The method of embodiment 34, wherein the one or more information elements comprises a type of link adaptation information reported.

Embodiment 38: The method of embodiment 37, wherein the type of link adaptation information reported comprises one or more of estimated modulation order, preferred modulation order, estimated MCS index, preferred MCS index, estimated code rate, preferred code rate, transport block size, and type of retransmission method.

Embodiment 39: The method of embodiment 34, wherein the one or more information elements comprises a granularity of the reported link adaptation information in a time domain, and/or a frequency domain, and/or a spatial domain.

Embodiment 40: The method of embodiment 34, wherein the one or more information elements comprises a type of reference signals that the user device can use for determining link adaptation information.

Embodiment 41: The method of embodiment 34, wherein the one or more information elements comprises one or more indications to start, stop, pause, resume and/or modify link adaptation reporting.

Embodiment 42: The method of embodiment 34, wherein the link adaptation report request comprises a list of time-frequency resources that the user device can use to transmit the link adaptation report.

Embodiment 43: The method of embodiment 31, further comprising determining, by the user device, one or more link adaptation parameter values based on machine learning (ML).

Embodiment 44: The method of embodiment 31, further comprising transmitting a link adaptation report acknowledge message to the network node, the link adaptation report acknowledge message indicating a successful initialization or a partially successful initialization of link adaptation reporting procedure.

Embodiment 45: The method of embodiment 31, further comprising transmitting a link adaptation report failure message to the network node, the link adaptation report failure message indicating an unsuccessful initialization of link adaptation reporting procedure.

Embodiment 46: A user device, adapted to:

determine a link adaptation report for communicating with a network node of a telecommunications network; and transmit a link adaptation report message to the network node, wherein the link adaptation report message comprises the link adaptation report.

Embodiment 47: The user device of embodiment 46, further adapted to perform the method of any one of embodiments 32 to 45.

Embodiment 48: A user device, comprising one or more transmitters;

one or more receivers; and processing circuitry associated with the one or more transmitters and the one or more receivers, the processing circuitry configured to cause the user device to:

determine a link adaptation report for communicating with a network node of a telecommunications network; and transmit a link adaptation report message to the network node, wherein the link adaptation report message comprises the link adaptation report.

Embodiment 49: The user device of embodiment 48, further adapted to perform the method of any one of embodiments 32 to 45.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMC Adaptive Modulation and Coding
AMF Access and Mobility Function
AN Access Network
AP Access Point
ASIC Application Specific Integrated Circuit
AUSF Authentication Server Function
BLER Block Error Rate
CPU Central Processing Unit
CQI Channel Quality Indicator
CSI Channel State Information
CSI-RS Channel State Information Reference Signal
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HARQ Hybrid Automatic Repeat Request
HSDPA High Speed Downlink Packet Access
HSS Home Subscriber Server
IoT Internet of Things
IP Internet Protocol
LTE Long Term Evolution
MCS Modulation and Coding Scheme
MIMO Multiple-Input Multiple Output
ML Machine Language
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
PMI Precoding Matrix Index
PRB Physical Resource Block
QoS Quality of Service
RAM Random Access Memory
RAN Radio Access Network
RBG Resource Block Group
RI Rank Indication
ROM Read Only Memory
RRH Remote Radio Head
RTT Round Trip Time
SCEF Service Capability Exposure Function
SI NR Signal to Noise and Interference Ratio
SMF Session Management Function
SNR Signal to Noise Ratio
SSB Synchronization Signal Block
TDD Time-Division Duplex
TTI Transmission Time Interval
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a network node of a telecommunications network for optimizing selection of radio resources and transmission format for a communication session with a user device, the method comprising:
- receiving, by the network node, a link adaptation report message from the user device, wherein the link adaptation report message comprises a link adaptation report;
- determining a scheduling grant comprising an allocation of radio resources for the user device based on the link adaptation report; and
- transmitting the scheduling grant to the user device,
- wherein determining the scheduling grant comprises selecting a reported Modulation and Coding Scheme, MCS, index value reported by the user device for determining an allocation of physical resource blocks, modulation order, code rate, and transport block size for communicating with the user device, either in uplink or downlink, in a transmission time interval.

2. The method of claim 1, wherein the link adaptation report further comprises an indicator indicating whether the one or more link adaptation parameters is associated with uplink or downlink transmission.

3. The method of claim 1, wherein the link adaptation report comprises a set of one or more link adaptation parameters estimated or preferred by the user device for link adaptation in a communication session with the network node, wherein the one or more link adaptation parameters comprises the MCS index value.

4. The method of claim 3, wherein the one or more link adaptation parameters further comprises a modulation order.

5. The method of claim 3, wherein the link adaptation report further comprises, for one or more of the one or more link adaptation parameters, one or more indicators of an associated estimated probability of success, an associated uncertainty in the associated estimated probability of success, or an associated confidence interval for the associated estimated probability of success.

6. The method of claim 2, wherein the link adaptation report further comprises a set of the one or more link adaptation parameters to be prioritized with an associated priority value.

7. The method of claim 1, wherein:
- the link adaptation report comprises one or more sets of at least one MCS index value, each being associated with a different transmission rank value; or
- the link adaptation report comprises one or more ranges of MCS index values, each being associated with a different transmission rank value; or
- the link adaptation report comprises one or more sets of at least one modulation order value and/or one or more sets of at least one coding rate value, each being associated with a different transmission rank value; or
- the link adaptation report comprises one or more ranges of modulation order values or one or more ranges of coding rate values, each being associated with a different transmission rank value.

8. The method of claim 1, wherein the link adaptation report comprises link adaptation parameters reported for one or more frequency bands.

9. The method of claim 8, wherein the link adaptation report further comprises link adaptation information reported according to one or more of wideband; per sub-band; per physical resource block, PRB; per resource block group, RBG; per bandwidth part; and per bandwidth segment in a frequency domain.

10. The method of claim 1, wherein:

the link adaptation report comprises link adaptation information reported according to a granularity in a time domain; and the granularity is per transmission time interval and/or per transmission time window.

11. The method of claim 1, further comprising transmitting a link adaptation report request to the user device, wherein the link adaptation report request comprises one or more information elements for configuring reporting of assistance information associated with link adaptation from the user device.

12. The method of claim 1, wherein:

determining the scheduling grant comprises combining a preference or estimate of MCS index values reported by the user device with another channel state information, CSI; and the CSI comprises one or more of a channel quality indicator, CQI; a rank; or a precoding matrix indicator, PMI, for determining an allocation of radio resources for communicating with the user device.

13. A network node, comprising:

one or more transmitters;

one or more receivers; and processing circuitry associated with the one or more transmitters and the one or more receivers, the processing circuitry configured to cause the network node to:

receive, by the network node, a link adaptation report message from a user device, wherein the link adaptation report message comprises a link adaptation report;

determine a scheduling grant comprising an allocation of radio resources for the user device based on a reported modulation and coding scheme, MCS, index value of the link adaptation report; and transmit the scheduling grant to the user device, wherein determining the scheduling grant comprises selecting the reported MCS index value reported by the user device for determining an allocation of physical resource blocks, modulation order, code rate, and transport block size for communicating with the user device, either in uplink or downlink, in a transmission time interval.

14. A method performed by a network node of a telecommunications network for optimizing selection of radio resources and transmission format for a communication session with a user device, the method comprising:

receiving, by the network node, a link adaptation report message from the user device, wherein the link adaptation report message comprises a link adaptation report;

determining a scheduling grant comprising an allocation of radio resources for the user device based on the link adaptation report; and transmitting the scheduling grant to the user device, wherein determining the scheduling grant comprises combining a preference or estimate of Modulation and Coding Scheme, MCS, index values reported by the user device with another channel state information, CSI; and wherein the CSI comprises one or more of a channel quality indicator, CQI; a rank; or a precoding matrix indicator, PMI, for determining an allocation of radio resources for communicating with the user device.

15. A network node, comprising:

one or more transmitters;

one or more receivers; and processing circuitry associated with the one or more transmitters and the one or more receivers, the processing circuitry configured to cause the network node to:

receive, by the network node, a link adaptation report message from a user device, wherein the link adaptation report message comprises a link adaptation report;

determine a scheduling grant comprising an allocation of radio resources for the user device based on a reported modulation and coding scheme, MCS, index value of the link adaptation report; and transmit the scheduling grant to the user device, wherein determining the scheduling grant comprises combining a preference or estimate of Modulation and Coding Scheme, MCS, index values reported by the user device with another channel state information, CSI; and wherein the CSI comprises one or more of a channel quality indicator, CQI; a rank; or a precoding matrix indicator, PMI, for determining an allocation of radio resources for communicating with the user device.

* * * * *